United States Patent
Tartaglia

[19]

[11] Patent Number: 5,943,163
[45] Date of Patent: Aug. 24, 1999

[54] OPTICAL AND INFRARED PERISCOPE

[75] Inventor: Robert M. Tartaglia, Middle Island, N.Y.

[73] Assignee: Selectron Management Corporation, Islip, N.Y.

[21] Appl. No.: 09/004,434

[22] Filed: Jan. 8, 1998

Related U.S. Application Data

[60] Provisional application No. 60/056,950, Aug. 25, 1997.

[51] Int. Cl.⁶ .............................. G02B 5/04; G02B 13/14; G02B 23/08
[52] U.S. Cl. .......................... 359/351; 359/403; 359/834
[58] Field of Search ..................................... 359/351, 353, 359/350, 403, 419, 831, 833, 834, 835

[56] References Cited

U.S. PATENT DOCUMENTS

| | | | |
|---|---|---|---|
| 3,454,322 | 7/1969 | Scidmore et al. | 359/403 |
| 3,549,231 | 12/1970 | Scidmore et al. | 359/403 |
| 4,621,888 | 11/1986 | Crossland et al. | 359/403 |
| 4,669,809 | 6/1987 | Patry et al. | 359/641 |
| 5,022,723 | 6/1991 | Schmidt et al. | 359/403 |
| 5,359,402 | 10/1994 | Grosmann et al. | 356/5 |

*Primary Examiner*—Jon Henry
*Attorney, Agent, or Firm*—Baker & Botts, L.L.P.

[57] ABSTRACT

An optical and infrared periscope includes a housing having an elongated 35 degree prism mounted in its upper portion in a position to receive a light image and refract and reflect the image toward a lower portion of the housing. The prism has a first portion of an optical grade glass that transmits and reflects light in a visible range of the light spectrum and a second portion of an optical grade single crystal silicon that transmits and reflects light in a range of wavelengths of from about three microns to about five microns. An HgCdTe focal plane array is provided in the lower portion of the housing for receiving the image reflected by the second portion of the prism and producing output signals representing the reflected image. The lower portion of the housing also contains an electronics package for processing the output signals and displaying a visible image on a cathode ray tube, which may be viewed through an eyepiece.

16 Claims, 2 Drawing Sheets

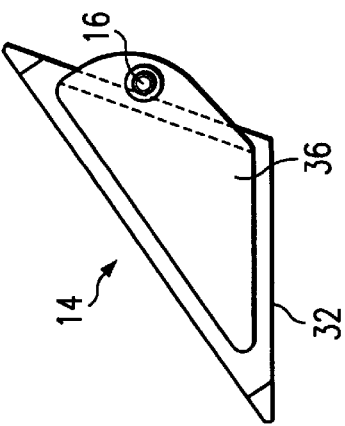
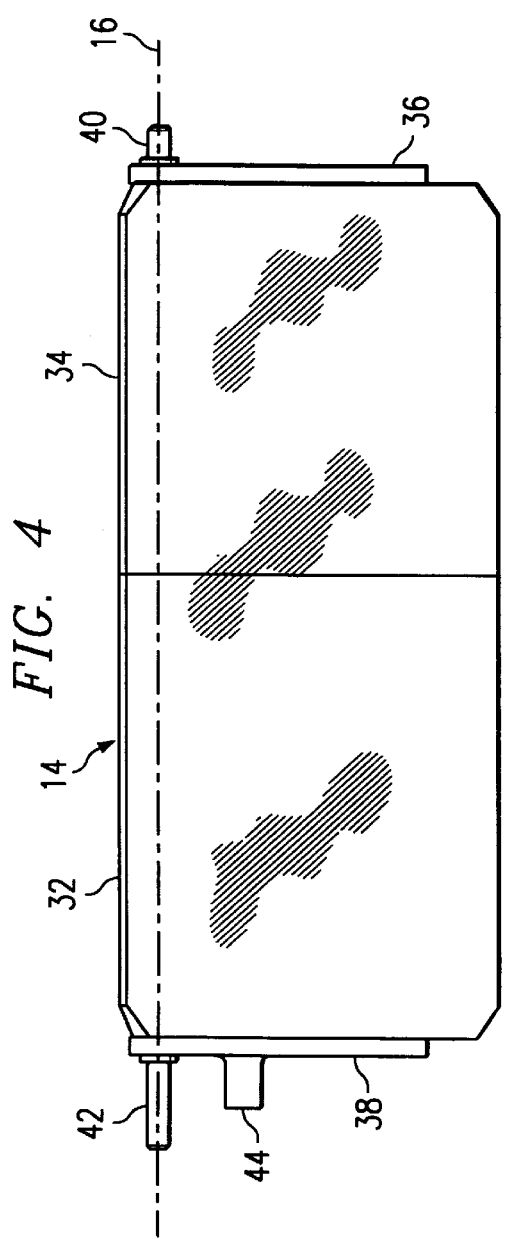
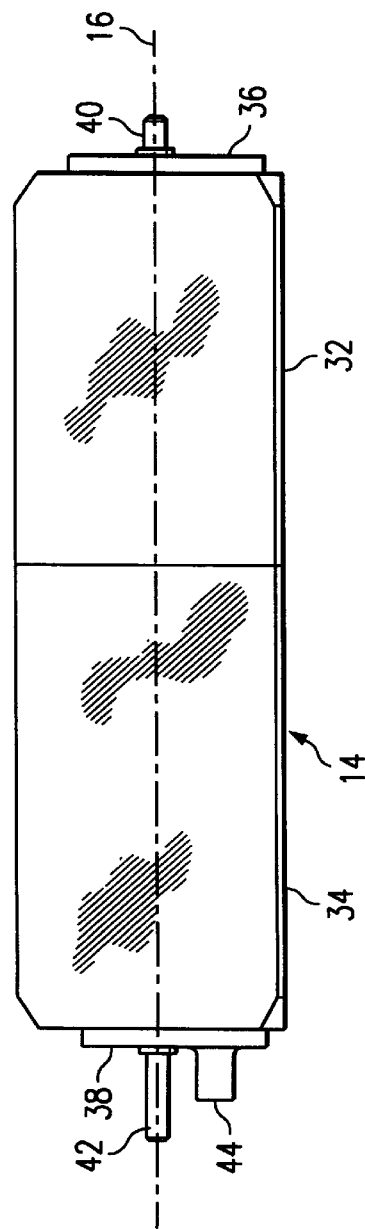

OPTICAL AND INFRARED PERISCOPE

PRIOR APPLICATION

The present application is based on U.S. Provisional Application Ser. No. 60/056,950, filed Aug. 25, 1997.

BACKGROUND OF INVENTION

The present invention relates to periscopes and to 3 to 5 micron imaging systems for use in connection with military vehicles, such as tanks, armored personnel carriers, assault vehicles, amphibious craft, ships and gun boats.

The assignee of the present invention, Selectron, currently sells a commander periscope Model M-36, which provides dual adjacent optical channels, including a first visible optical channel and a second image-intensified optical channel. The system includes an upper housing in which a pivotable 35° prism reflector is mounted for adjusting the elevation angle of the field of view. Using an elongated prism, there are provided side-by-side optical paths for the visible light optical channel and the image-intensified optical channel. The pivotable prism is mounted in the upper housing and is capable, by use of refraction, of viewing high elevation and low depression elevation angles as compared to mirror systems. Respective visible optical and image-intensified viewing systems are mounted in first and second lower housings, which are connected to the bottom of the upper housing for receiving light images therefrom.

In connection with enhancing night time or other low visibility capability of military vehicles it is desirable to provide imaging in the 3 to 5 micron spectral band in addition to visible and low light optical imaging. Infrared imaging may be provided as an alternate to image intensification.

A significant problem in providing infrared imaging in a unit which heretofore has accommodated only visible wavelength imaging is the fact that glass materials, used for prisms reflectors in known periscopes, are opaque to energy in the 3 to 5 micron in the spectral band. It is therefor an object of the present invention to provide a dual band periscope which provides side-by-side imaging of an optical field of view in the visible light spectral band and the 3 to 5 micron spectral band.

SUMMARY OF THE INVENTION

There is provided, in accordance with the present invention, an optical and infrared periscope that includes a housing and an elongated prism mounted in an upper portion of the housing and positioned to receive a light image from outside the housing and reflect the image along the housing toward a lower portion. The prism has a first portion that transmits and reflects light in a visible range of the light spectrum and a second portion that transmits and reflects light in the infrared range of the light spectrum. The second portion of the prism may transmit and reflect light in the range of wavelengths of from about three microns to about five microns, a suitable material for the second portion being an optical grade single crystal silicon. Alternatively, the second portion may transmit and reflect light in a range of wavelengths of from about eight microns to about twelve microns, a suitable material being an optical grade Germanium crystal.

In advantageous embodiments of the present invention, the first and second portions abut each other and are bonded at a juncture by an adhesive. The prism is, preferably, a 35 degree prism and is mounted in the housing for pivotal movement about an axis transverse to the image field of the prism so as to enable the field of view to be changed.

In a particularly preferred configuration, an optical and infrared periscope, according to the present invention, comprises a housing with an elongated prism mounted in its upper portion in a position to receive a light image from outside the housing and refract and reflect the image along the housing toward a lower portion of the housing. The prism, which may be a 35 degree prism, has a first portion of an optical grade glass that transmits and reflects light in a visible range of the light spectrum and a second portion of an optical grade single crystal silicon that transmits and reflects light in a range of wavelengths of from about three microns to about five microns. The first and second portions abut each other at a juncture and are bonded at the juncture by an adhesive. The prism is mounted in the housing for pivotal movement about an axis transverse to the image field of the prism so as to enable the field of view to be changed. A suitable detector/transducer, such as an HgCdTe focal plane array, is provided in the lower portion of the housing for receiving the image reflected by the second portion of the prism and producing output signals representing the reflected image. The housing also contains an electronics package for processing the output signals and displaying a visible image representative of the reflected image to a user, for example, by means of a cathode ray tube in the lower portion of the housing and an eyepiece adapted to enable the user to view the visible image on the tube.

For a better understanding of the invention, reference may be made to the following description of an exemplary embodiment, taken in conjunction with the figures of the accompanying drawings.

BRIEF DESCRIPTION OF THE DRAWINGS

FIG. 4 is a top view of a prism for a periscope in accordance with the present invention.

FIG. 5 is a front view thereof.

FIG. 6 is a side view thereof.

DESCRIPTION OF THE PREFERRED EMBODIMENT

Figure 1:
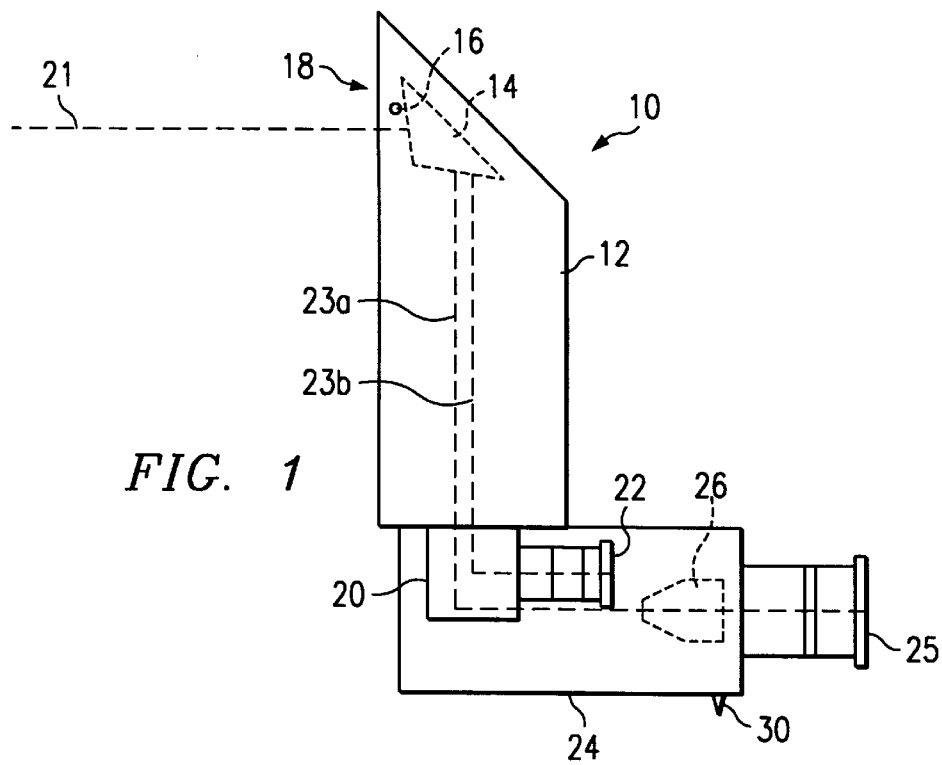
FIG. 1 is a side view of a dual band periscope in accordance with the present invention.

Referring to FIG. 1 a dual band periscope assembly 10 includes an upper housing 12 within which is mounted a prism assembly 14 which is pivotable about a horizontal axis 16 thereby to adjust the elevation angle of the field of view of the periscope. Assembly 10 includes a first lower housing 20 associated with daylight visible light optics, which includes eyepiece 22. Lower housing 20, eyepiece 22 and the optical components thereof are identical to the corresponding components provided in connection with the aforementioned M-36 periscope system.

Figure 2:
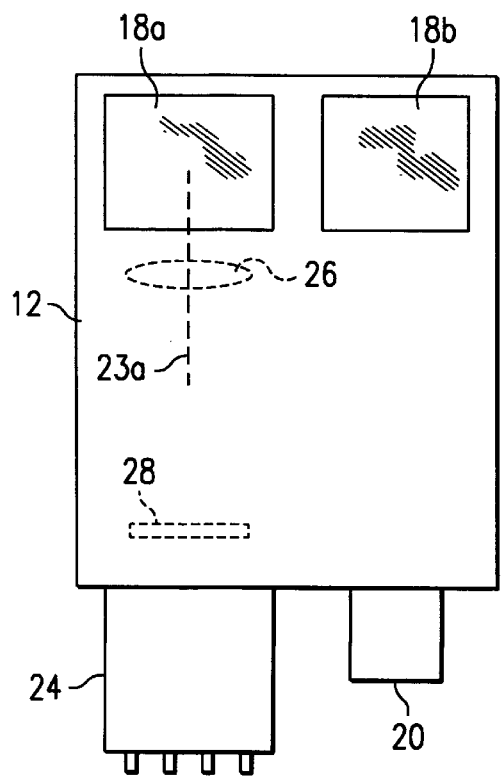
FIG. 2 is a front view thereof.
Figure 3:
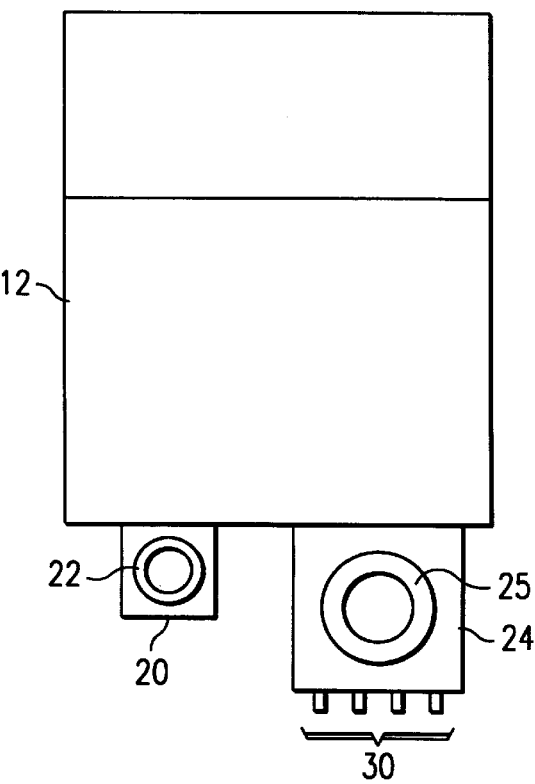
FIG. 3 is a rear view thereof.

The aforementioned M-36 periscope system typically includes a second lower housing within which is mounted an image intensifying optical system for receiving and intensifying low-light images for observation through an eyepiece. Such image intensifying systems are useable, for example, in low light conditions, such as on a moonless starlit night, and provide for electronic intensification of visible light images. In accordance with the invention periscope 10 includes, as a substitute for an image intensifying lower housing unit, a lower housing unit 24 which provides for detection and display to the operator of infrared emissions. Such emissions are captured on a suitable detector, such as a focal plane array, for example an HgCdTe-FPA detector. For purposes of providing the infrared field image to a detector, modification, in accordance with the present invention, has been made to the pivotable prism 14 so that infrared light, which would normally be absorbed in a glass prism, can be refracted and reflected by prism assembly 14 into a detector 28, such as a focal plane array. In accordance with the invention, as shown in FIG. 2, the upper assembly 12 of periscope 10 is provided with separate windows 18a and 18b. Window 18a is fabricated of material such as optical grade silicon, which is transparent to light in the infrared spectral band of interest, such as the 3 to 5 micron band, which corresponds to normal self-emissions in the infrared. Window 18b is transparent to visible wavelengths.

In accordance with the invention, prism assembly 14, which is shown in detail in FIGS. 4, 5 and 6, is provided in upper housing 12 and is arranged to pivot about axis 16 in order to provide adjustment of the elevation angle of both the optical and infrared field of view. Prism assembly 14 includes first prism member 32, which is transparent to visible light and manufactured from optical grade glass. A second prism portion 34 is manufactured from material which is transparent to infrared light in the band of interest. For example, in connection with a system for observing self-emissions in the 3 to 5 micron band, prism portion 34 might typically be made of optical grade, single crystal silicon, available from Silicon Casting, Inc., of Rancho Cordova, Calif. If it is desired to observe infrared emissions in the 8 to 12 micron band, prism portion 34 may be made of a material which is transparent in that band, such as a Germanium crystal. Prism portions 32 and 34 each comprise a 35° prism which is both refractive and reflective as is well known to those skilled in the art. Portions 32 and 34 are joined together using adhesive, such as Military Specification MIL-A-48611 9MU). Both are preferably coated to reduce surface reflections in their respective frequency band. Prism assembly 14 includes end pieces 36 and 38 which includes pivot axles 40 and 42. A drive member 44 on end piece 38 is used to mechanically adjust the pivot angle of pivot assembly 14 about axis 16.

In accordance with the invention visible light entering window 18b of periscope 10 is refracted and reflected by prism portion 32 along a path 23b into the optical viewing members contained in housing 20 and eyepiece 22 to provide conventional visible light observation. Infrared emissions, such as self-emissions of personnel and equipment, pass through window 18a and are refracted and reflected by prism portion 34 along infrared optical path 23a, through infrared focusing lens 26, onto an infrared detector 28, such as the aforementioned focal plane array. Lower housing 24 includes the electronics required for processing the detected infrared image and providing a visible display of the image elements on cathode ray tube 26 for observation through eyepiece 25. Remote viewing may also be provided through a cable carrying the video image signal. The processing of the infrared image and display can be controlled through control elements 30 on the bottom of housing 24. The processing may include electronic insertion of a reticule.

I claim:

1. An optical and infrared periscope comprising a housing and an elongated prism mounted in an upper portion of the housing and positioned to receive a light image from outside the housing and reflect the image along the housing toward a lower portion, the prism having a first portion that transmits and reflects light in a visible range of the light spectrum and a second portion that transmits and reflects light in the infrared range of the light spectrum, the first and second portions being laterally adjacent each other with respect to image paths of light from the prism portions to the lower part of the housing.

2. A periscope according to claim 1, wherein the second portion transmits and reflects light in a range of wavelengths of from about three microns to about five microns.

3. A periscope according to claim 2, wherein the second portion is formed of an optical grade single crystal silicon.

4. A periscope according to claim 1, wherein the second portion transmits and reflects light in a range of wavelengths of from about eight microns to about twelve microns.

5. A periscope according to claim 4, wherein the second portion is formed of an optical grade Germanium crystal.

6. A periscope according to claim 1, wherein the first and second portions abut each other and are bonded at a juncture by an adhesive.

7. A periscope according to claim 1, wherein the prism is a 35 degree prism.

8. A periscope according to claim 1, wherein the prism is mounted in the housing for pivotal movement about an axis transverse to the image field of the prism so as to enable the field of view to be changed.

9. An optical and infrared periscope comprising a housing and an elongated prism mounted in an upper portion of the housing and positioned to receive a light image from outside the housing and refract and reflect the image along the housing toward a lower portion of the housing, the prism having a first portion of an optical grade glass that transmits and reflects light in a visible range of the light spectrum and a second portion of an optical grade single crystal silicon that transmits and reflects light in a range of wavelengths of from about three microns to about five microns.

10. A periscope according to claim 9, wherein the first and second portions abut each other at a juncture and are bonded at the juncture by an adhesive.

11. A periscope according to claim 9, wherein the prism is a 35 degree prism.

12. A periscope according to claim 9, wherein the prism is mounted in the housing for pivotal movement about an axis transverse to the image field of the prism so as to enable the field of view to be changed.

13. A periscope according to claim 9 and further comprising means for receiving the image reflected by the second portion of the prism and producing output signals representing the reflected image, and means for processing the output signals and displaying a visible image representative of the reflected image to a user.

14. A periscope according to claim 13 wherein the means for receiving the image reflected by the second portion of the prism and producing output signals representing the reflected image is an HgCdTe focal plane array.

15. A periscope according to claim 13 wherein the means for processing the output signals and displaying a visible image representative of the reflected image to a user include a cathode ray tube in the lower portion of the housing and an eyepiece adapted to enable the user to view the visible image.

16. An optical and infrared periscope comprising a housing, an elongated 35 degree prism mounted in an upper portion of the housing and positioned to receive a light image from outside the housing and refract and reflect the image along the housing toward a lower portion of the housing, the prism being mounted for pivotal movement about an axis transverse to the image field of the prism for adjustment of the field of view and having a first portion of an optical grade glass that transmits and reflects light in a visible range of the light spectrum and a second portion of an optical grade single crystal silicon that transmits and reflects light in a range of wavelengths of from about three microns to about five microns, an HgCdTe focal plane array positioned in a lower portion so as to receive the image reflected by the second portion of the prism and being adapted to produce output signals representing the reflected image, means for processing the output signals and displaying a visible image representative of the reflected image on a cathode ray tube in the lower portion of the housing, and an eyepiece adapted to enable a user to view the visible image on the cathode ray tube.

* * * * *